United States Patent
Chen et al.

(10) Patent No.: US 8,819,831 B2
(45) Date of Patent: Aug. 26, 2014

(54) REMOTE PROCEDURE CALL (RPC) SERVICES FUZZ ATTACKING TOOL

(75) Inventors: Friar Chen, Beijing (CN); Pengcheng Dun, Beijing (CN); Zhiye Wang, Beijing (CN)

(73) Assignee: CA, Inc., Islandia, NY (US)

( * ) Notice: Subject to any disclaimer, the term of this patent is extended or adjusted under 35 U.S.C. 154(b) by 844 days.

(21) Appl. No.: 12/570,540

(22) Filed: Sep. 30, 2009

(65) Prior Publication Data

US 2011/0078798 A1    Mar. 31, 2011

(51) Int. Cl.
*G06F 11/00*    (2006.01)
(52) U.S. Cl.
USPC ............... 726/25; 726/22; 726/23; 726/24
(58) Field of Classification Search
USPC .......................................... 726/25, 22, 23, 24
See application file for complete search history.

(56) References Cited

U.S. PATENT DOCUMENTS

| | | | | |
|---|---|---|---|---|
| 2,797,549 | A * | 7/1957 | Probert et al. | 60/39.23 |
| 7,475,427 | B2 * | 1/2009 | Palliyil et al. | 726/24 |
| 7,941,851 | B2 * | 5/2011 | Shahar et al. | 726/22 |
| 7,953,674 | B2 * | 5/2011 | Wu et al. | 706/1 |
| 2004/0255163 | A1 * | 12/2004 | Swimmer et al. | 713/201 |
| 2005/0273859 | A1 * | 12/2005 | Chess et al. | 726/25 |
| 2006/0143709 | A1 * | 6/2006 | Brooks et al. | 726/23 |
| 2008/0276313 | A1 * | 11/2008 | Kummu et al. | 726/22 |
| 2008/0301813 | A1 * | 12/2008 | Neystadt et al. | 726/25 |
| 2008/0320328 | A1 * | 12/2008 | O'Leary | 714/25 |
| 2009/0164478 | A1 * | 6/2009 | Natanov et al. | 707/100 |
| 2009/0313699 | A1 * | 12/2009 | Jang et al. | 726/23 |
| 2010/0058475 | A1 * | 3/2010 | Thummalapenta et al. | 726/25 |
| 2010/0125913 | A1 * | 5/2010 | Davenport et al. | 726/25 |
| 2010/0138925 | A1 * | 6/2010 | Barai et al. | 726/25 |

* cited by examiner

*Primary Examiner* — Mohammad W Reza
(74) *Attorney, Agent, or Firm* — Myers Bigel Sibley & Sajovec, P.A.

(57) ABSTRACT

A system and method for testing a computer program using a computer system includes a plurality of computer systems communicating using a network. An interface parser module defines at least one program interface in a program file of a specified program. A fuzzer module reads the program file and identifies the program interfaces. An attack data generator module attacks the program interfaces and communicates with the fuzzer, and the fuzzer determines vulnerabilities in the specified program. A recorder records the attacking procedure. A verifier verifies remedies for vulnerabilities by replaying the attacking procedure of the program interface and determining vulnerabilities. A service status detective module restarts the specified program when the specified program ceases to operate or crashes.

16 Claims, 4 Drawing Sheets

REMOTE PROCEDURE CALL (RPC) SERVICES FUZZ ATTACKING TOOL

FIELD OF THE INVENTION

The present invention relates generally to the field of testing computer programs, and more particularly, the present invention relates to a tool or system for testing computer software such as computer programs for initiating remote procedure calls (RPC).

BACKGROUND OF THE INVENTION

Computer programs are typically debugged and tested using various methods. One method is to simulate an attack on the program or computer system to test for flaws or vulnerabilities in the program or system. For example, in the field of computer technology, Remote Procedure Call (RPC) is a technique that provides for a computer program to initiate a subroutine or procedure of a software package to execute in another address space (commonly on another computer on a shared network). The RPC occurs without a programmer explicitly coding the details for the remote interaction. For example, the RPC occurs whether the subroutine is local to the executing program or remote in relation to the executing program. It is noted that when the software package is written using Object-Oriented principles, RPC may be referred to as Remote Invocation or Remote Method Invocation. Different technologies have developed which are commonly used to accomplish RPC. However, one problem with current technologies is that the technologies are often incompatible with each other.

There are many RPC services within, for example, ARCserve® Backup, such as a User Authentication Service, and Message Engine Service, these RPC services provide various interfaces for communication. Further, these interfaces accept and process user inputted data, and return the process result to the user. For example, a User Validation Service accepts the user name and password that is typed in by a user, and returns the validation result to the user.

Currently, there are vulnerabilities and flaws for computer software or computer programs, for example RPC services, which are typically revealed by third parties using the program. Program vulnerabilities and flaws are undesirable as costing the software provider loss of sales, costs for development and deployment of patches, and the loss of reputation. One of the basic reasons for the vulnerabilities and flaws of programs occurs when the software does not properly check input data, for example, when the RPC services does not check the user input data properly, the program assumes that all user input data is good and properly organized, and does not go beyond the limitation of the program. For example, a User Validation Service assumes that all inputted user names are less than 1024 characters which is typically correct in everyday use, however, some attackers may generate a meaningless user name which is longer than 1024 characters, for example, 4096 characters. Therefore, it is undesirable for RPC services to make assumptions for user input data.

It would therefore be desirable to provide a method for testing software including its service interfaces before releasing the software product into the market. For example, it would be desirable to provide a method for testing RPC software including service interfaces before releasing the software product into the market. It would further be desirable to provide a method for testing software, for example RPC software, in an automated fashion.

SUMMARY OF THE INVENTION

In an aspect of the invention, a method for testing a computer program using a computer system includes computer readable medium having a program recorded thereon and is executable by a processing unit, comprising the steps of: providing a plurality of computer systems communicating using a network; identifying at least one program file in a specified program; defining at least one program interface in the program file of the specified program; specifying an attacking procedure of the specified program; attacking the interface in the program file; recording the attacking procedure; defining vulnerabilities in the specified program; and determining vulnerabilities in the specified program using the recorded attacking procedure.

In a related aspect, the method further comprises: manually remedying the vulnerabilities in the specified program; and verifying the remedies by replaying the attacking procedure of the interface and determining vulnerabilities. The method may include the specified program including a plurality of program interfaces. The method may further comprise restarting the specified program when the specified program ceases to operate. The method may automatically perform the steps. The step of defining at least one program interface may use an interface parser module. The specified program may be an RPC program having RPC interfaces, and an IDL file may be the program file. The method may further include the step of converting the IDL file into an XML file. In a related aspect, a fuzzer module reads the XML file and identifies the RPC interfaces. In a further related aspect, the step of attacking the interface uses an attack data generator module communicating with the fuzzer. In another related aspect, the method includes restarting the RPC program when the RPC program ceases operation using a service status detective module. The method may further include: manually remedying the vulnerabilities in the specified program; and verifying the remedies using a verifier module by replaying the attack of the interface using a recorder and determining vulnerabilities.

In another aspect of the invention, a computer program product for use with a computer includes a computer readable medium having recorded thereon a computer program or program code. The computer program is executed by a processing unit for testing a computer program using a plurality of computer systems communicating using a network, the computer program performing the steps of: identifying at least one program file in a specified program; defining at least one program interface in the program file of the specified program; specifying an attacking procedure of the specified program; attacking the interface in the program file; recording the attacking procedure; defining vulnerabilities in the specified program; and determining vulnerabilities in the specified program using the recorded attacking procedure.

In a related aspect, the computer program product further includes: verifying the remedies by replaying the attacking procedure of the interface and determining vulnerabilities, after remedying the vulnerabilities in the specified program. The computer program product may further comprise, restarting the specified program when the specified program ceases to operate. The computer program product may also include the specified program as an RPC program having RPC interfaces and an IDL file as a program file, and the IDL file may be converted into an XML file. A fuzzer module may read the XML file and identify a plurality of RPC interfaces, and an attack data generator module may communicate with the fuzzer for attacking the RPC interfaces. The computer program product may further comprise verifying the remedies using a verifier module by replaying the attack of the interface using a recorder, and determining vulnerabilities after remedying the vulnerabilities in the specified program.

In another aspect of the invention, a system for testing a computer program using a computer system includes computer readable medium having a program recorded thereon which is executable by a processing unit. The system includes a plurality of computer systems communicating using a network. An interface parser module defines at least one program interface in a program file of a specified program. A fuzzer module reads the program file and identifies the program interfaces. An attack data generator module attacks the program interfaces and communicates with the fuzzer, and the fuzzer determines vulnerabilities in the specified program. A recorder records the attacking procedure.

In a related aspect, the system further includes a verifier for verifying remedies of vulnerabilities by replaying the attacking procedure of the program interface and determining vulnerabilities. The system may further include a service status detective module for restarting the specified program when the specified program ceases to operate.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
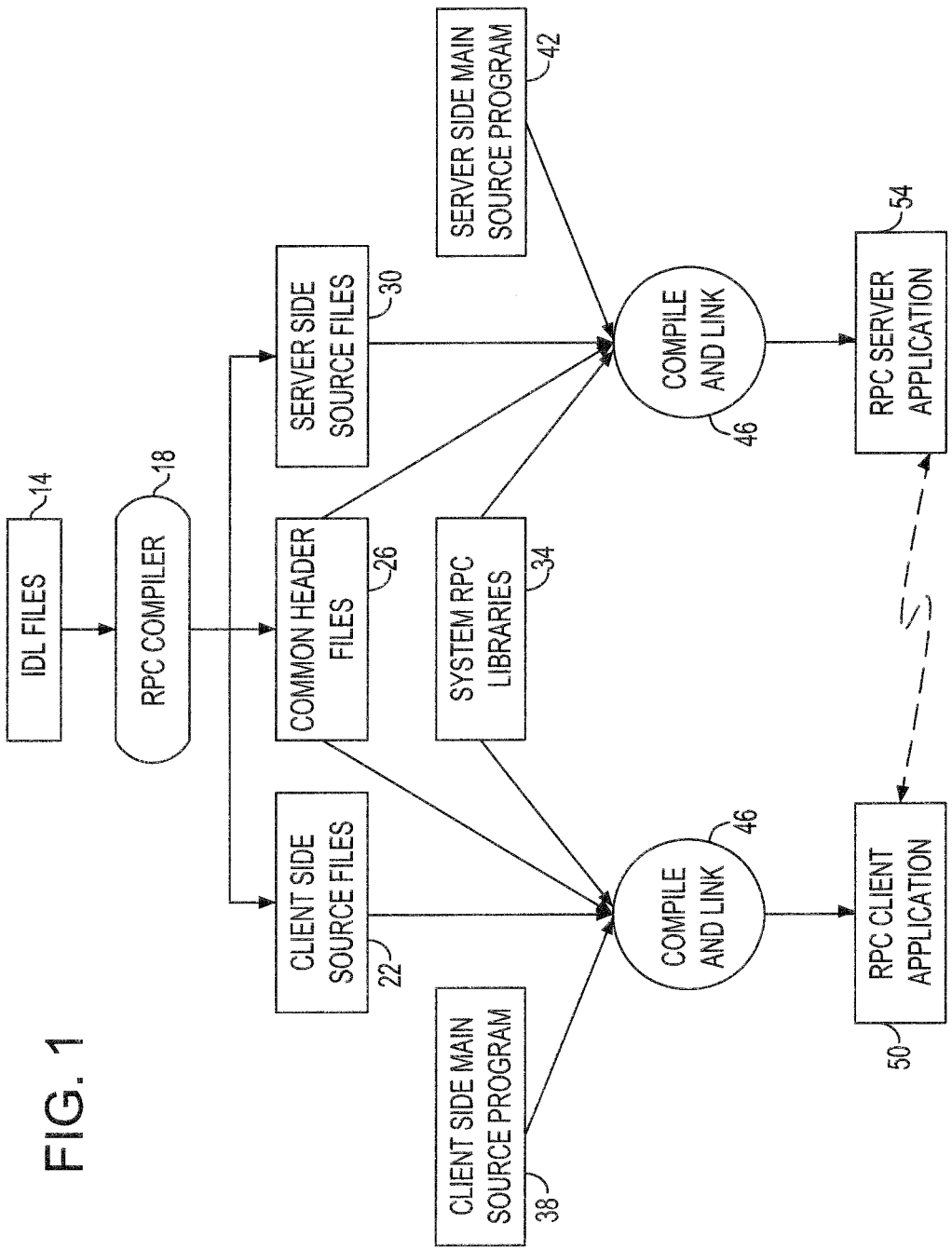
FIG. 1 is a schematic block diagram of the development of an RPC program.

Referring to FIG. 1, an interface description language (IDL), is a specification language used to describe a software component's interface. IDLs are commonly used in remote procedure call (RPC) software. In a computer system using RPC, computers 150, 170 communicate using a communications link between the computers such as in a local or wide area network 160. The computers at either end of the link may be using different operating systems and computer languages. The IDLs provide a bridge for communications between the different systems in linked computers.

Referring to step 14 in FIG. 1, an RPC program includes RPC interfaces defined in an IDL file. In step 18, the IDL file is compiled using an RPC compiler. The RPC compiler generates client side source files 22, common header files 26, and server side source files 30. The client side source files 22, common header files 26 and a client side main source program 38 are compiled and linked to form an RPC client application 50. Similarly, the server side source files 22, common header files 26 and a server side main source program 42 are compiled and linked to form an RPC server application 54. At this point, the generated RPC client application and server application have no other interaction other than being connected to each other via the network. Further, a user can add business logic for a specified purpose into the client side source files 22 and the server side source files 30, to generate the RPC client application 50 and the RPC server application 54, then these applications can execute the business logic and accomplish the specified purpose.

Figure 2:
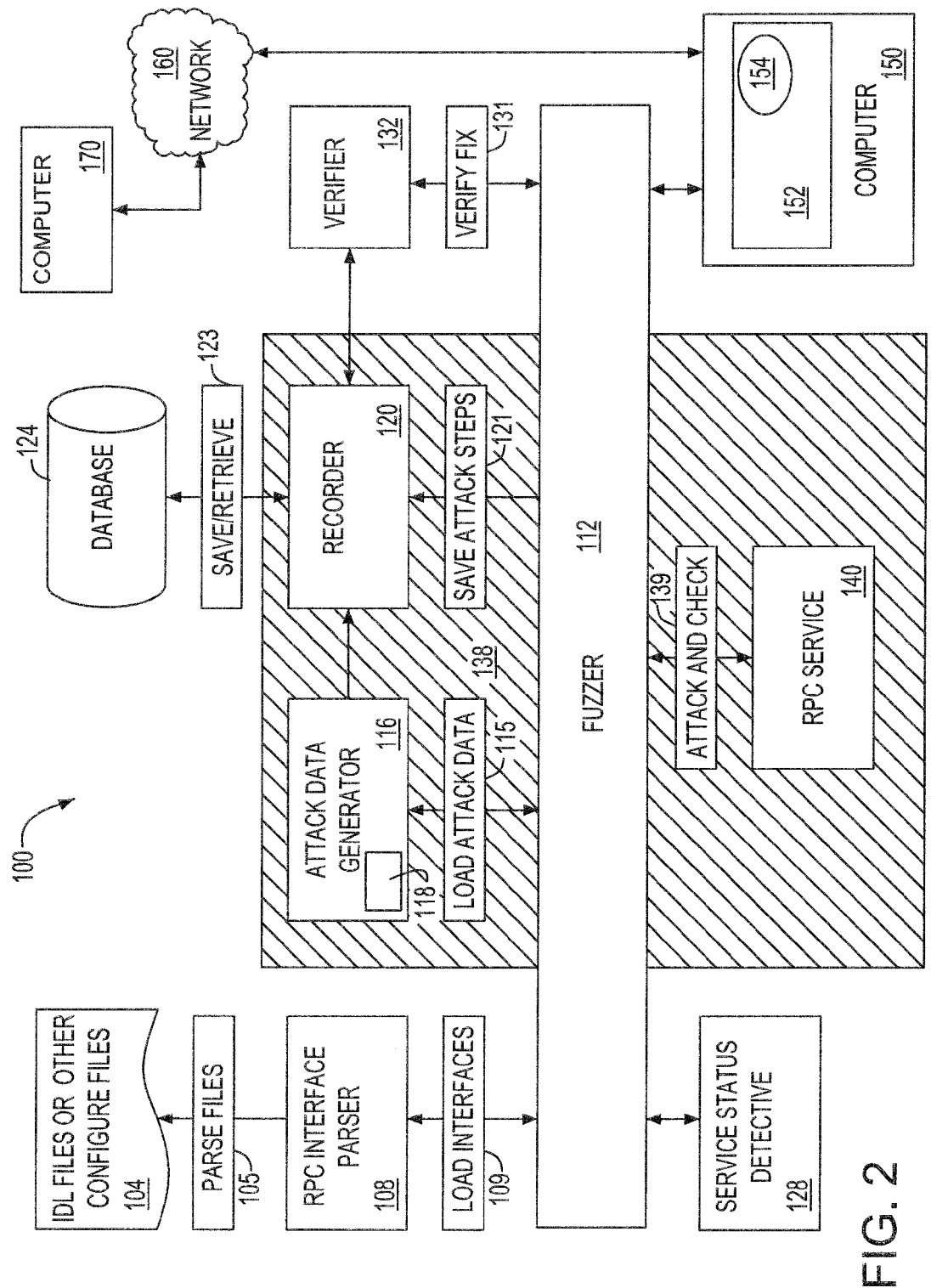
FIG. 2 is a schematic block diagram of the modules and method of an embodiment of a services attacking system/tool according to the present invention embodied as an RPC services attacking tool and a computer system.

Referring to FIG. 2, an embodiment of a software or program testing tool or system is embodied as an RPC services attacking tool or system 100 according to the present invention. The system 100 includes the step of identifying configure files embodied as IDL files or other configure files in a target program embodied as an RPC program in step 104. The system 100 includes modules embodied as below. An RPC interface parser 108 interprets (in step 105) the IDL files and converts them into XML files. A fuzzer 112 reads the XML file and determines a list of defined RPC interfaces. The fuzzer 112 executes, for example in a programming loop, individual attacks on each interface of an RPC program (or service) 140. The fuzzer 112 uses an attack data generator 116 to attack each interface of the RPC program 140 with various randomized data. A recorder 120 records the attack progress (managed by the fuzzer 112 in step 121), in a database 124 (in step 123), including the interface, attacking data, and steps of the attack into a data file. A service status detective 128 detects the RPC service status, and restarts it if necessary. Once any vulnerabilities are detected, remedies or fixes can be implemented by adding or change program code in the target program, in this embodiment, the RPC program.

A verifier 132 reads the data file generated by the recorder 120 to replay the attack progress to check whether the vulnerability has been fixed. A user of the RPC services attacking tool 100 initiates the fix process after a problem is found by the tool 100. During the fix process, the user can initiate the verifier 132 to verify the fix. Various vulnerabilities can be detected using the RPC services attacking tool 100, which may be found during software development including, for example, integer overflow, buffer overflow, and invalid handle.

According to the embodiment of the present invention shown in FIG. 2, the fuzzer 112 is part of a computer program 154 that probes a software application, embodied as an RPC program, to discover security vulnerabilities. The computer program 154 is stored on computer readable medium 152 on a computer 150 which communicates with the modules shown in FIG. 2. The computer program 154 includes the system 100 components identified as the RPC interface parser 108, attack data generator 116, recorder 120, verifier 132, fuzzer 112, and the service status detective 128. The fuzzer 112 sends random inputs to the application to detect vulnerabilities. In the embodiment of the present invention, a vulnerability in the program is defined as detecting an RPC program response to the fuzzer 112 which can lead to an exception, crash, or server error (in the case of web applications). The attack subsystem 138 of the tool 100 includes the fuzzer 112, the attack data generator 116, and the recorder 120.

The RPC services attacking tool 100 acts as an outside attacker to RPC services or the RPC program to determine if the RPC services or program, for example, creates an exception, crashes (e.g., abruptly close or freeze), initiates code assertions, and/or fails to provide service. The terminologies of exception, crash, and assertion are particular to software development and are defined herein. Exception is handling a programming language construct or computer hardware mechanism designed to handle the occurrence of exceptions or special conditions that change the normal flow of program execution. A crash (or system crash) in computing is a condition where a program (which may include an application or part of the operating system) stops performing its expected function, and also stops responding to other parts of the system. For example, a crash includes when the program may appear to freeze. If the program is a critical part of the operating system kernel, the entire computer may crash. In computer programming, an assertion is a predicate, (i.e., a true or false statement) placed in a program to indicate that the predicate is always true or false in that place in the program. Thus, if a failure of an assertion occurs, it indicates an error in the program. For example, if a program encounters any of the three situations, an exception, crash and assertion, it will most likely fail to provide services.

Once any of the above situations, an exception, crash and/or assertion, are discovered, the vulnerability of the RPC services is revealed and may be recorded. When a vulnerability is detected, the source code related to the vulnerability can be found and the cause of the vulnerability remedied by modifying or adding code. Additionally, the RPC services attacking tool may be run subsequent to remedying exposed problems to check if the vulnerability has been adequately remedied.

One advantage of the RPC services attacking tool of the present invention works for all RPC based applications. Another advantage of the RPC services attacking tool is it requires few system resources, and thus does not unduly load the computer. Further, several RPC based tools 100 can be used to attack the same RPC service to further test the RPC service. A further advantage of the RPC services attacking tool 100 of the present invention, includes the steps of the method being automatically executed, thereby requiring less manual intervention.

More specifically, referring to FIG. 2, the fuzzer 112 is the main module of the tool 100 which connects to the other modules and controls the work flow. The RPC Interface Parser translates RPC interfaces which are defined in the IDL file(s) or other configuration files to an internal format that can be used directly by other modules of the tool 100. The attack data generator 116 works with the RPC interface parser 108 by generating the corresponding data for a specified RPC interface. The attack data generator 116 also works with the recorder 120 to save the generated data in step 123. The attack data generator is able to generate various, and a large amount of data, for a specified RPC interface. The recorder 120 records the attack steps and data of the attacking process for each RPC interface.

The verifier 132 is used after a detected vulnerability is fixed, to validate the fix or remedy. The verifier 132 uses the recorded steps/data from the recorder 120, in step 123, to repeat the attacks and validate that source code changes have remedied the vulnerabilities in step 131. The service status detective 128 is a standalone utility which provides the status of a specified service. For example, attacking RPC services can lead services into one of following vulnerability states: throwing exceptions, crashing, failing built-in code assertions, failing to provide service. Detecting the last scenario of failing to provide services can be accomplished inside an attack program in the attack data generator 116. However, it is too complex to detect the remaining states using the attack program. Therefore, the service status detective 128 is used to provide the status of a specified service.

Figure 3:
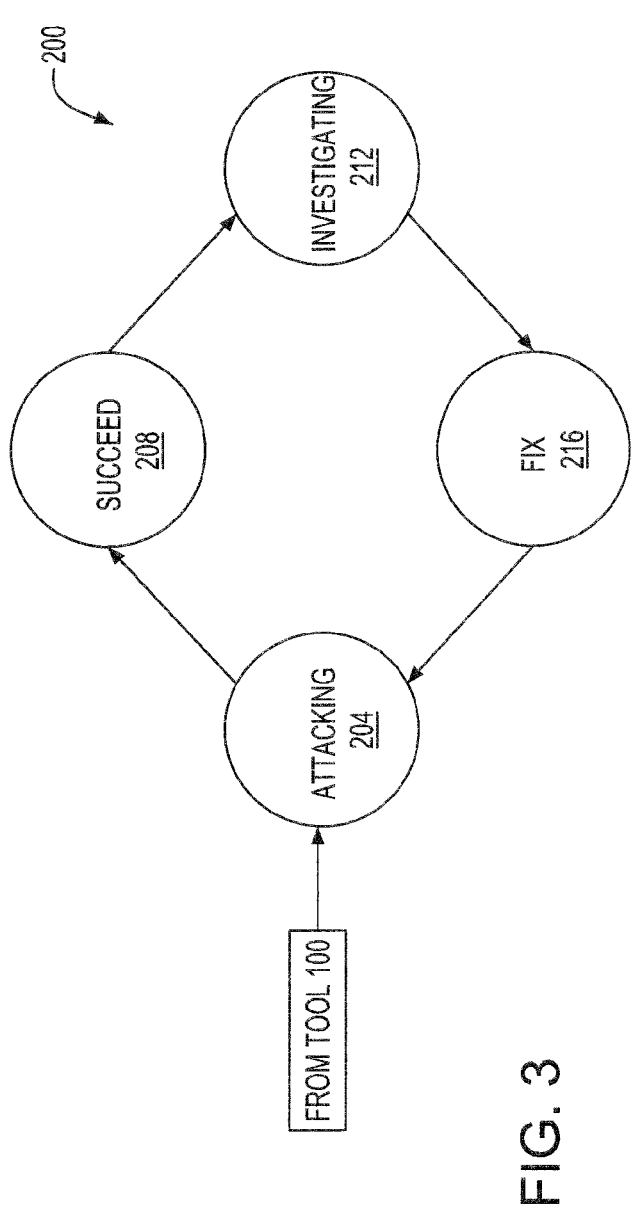
FIG. 3 is a flow chart illustrating fixing and verifying the fix of program vulnerabilities according to an embodiment of the invention.

Referring to FIG. 3, a flow chart 200 depicts an embodiment of the invention using the tool 100 to continuously attack RPC service interfaces in step 204, and record the attack steps and data used if the attack succeeds 208. The tool 100 then reruns the attack steps to ensure that the vulnerability is reproduced. If the attack can be reproduced, a user investigates the target interface for the vulnerability in step 212. The user fixes the problem in the RPC service in step 216 using the recorder data to isolate and change source code to remedy the vulnerability. The fix 216 is verified by reproducing the steps and data used to rerun the attack 204, verifying the code changes have remedied the vulnerability.

Referring to FIG. 2, the fuzzer is discussed in more detail below. The fuzzer 112 manages the tasks of invoking an RPC interface parse to load RPC interfaces, in step 109, from either IDL files or other configure files at the beginning of execution of the tool 100. The RPC interface parser 108 converts the RPC interfaces defined in IDL files into XML format for future usage. This step is necessary if the IDL files are changed since a last conversion. The fuzzer 112 dynamically loads the RPC interface and uses the interface to communicate, in step 139, with RPC Service application 140. All the RPC interfaces are defined in the XML file from the IDL files as described above. The fuzzer loads the RPC interfaces and manages the sequential attack, in step 115, on each RPC interface. The RPC interfaces are RPC clients which send requests to RPC service applications which are the attack target. The fuzzer also manages invoking the attack data generator 116 to generate the test data for a specified RPC interface. During the attack progress of each interface, the fuzzer 112 invokes the attack data generator 116 to generate attack data for each input parameter. The fuzzer 112 invokes the recorder 120 to record the attacking interface, attack steps, and attack data into a data file. The data file can be used later to replay the attack and verify fixes.

The service status detective 128 detects whether the attack for the target application is successful, for example, the service status detective 128 checks whether the RPC service application crashed, throws exceptions, or triggered an assertion. If one of the above situations is met, the service status detective 128 notifies the fuzzer 112, and then restarts the RPC service for further attacking. The fuzzer 112 invokes the recorder to record the attack case and record the attack as successful. Also, the fuzzer 112 informs a user that an attack succeeded, and the user can investigate the vulnerability manually. The fuzzer 112 verifies fixes by reproducing the attack process from recorded steps and/or data. The fuzzer initiates a notification to a user that an attack is successful. The user can investigate why the attack succeeded, and initiate a remedy for the vulnerability. Using the verifier 132, the attack can be replayed to verify the remedy or fix of the vulnerability is successful.

Further referring to FIG. 2, the RPC Interface Parser 108 parses the RPC interfaces from IDL files or other configure files, and then provides the analyzed RPC interfaces to other modules in a predefined manner. According to the embodiment of the invention shown in FIG. 2, the Fuzzer 112 invokes the RPC interface parser 108 to receive the RPC interfaces. The RPC interface parser 108 is capable of analyzing IDL files of different manufacturers. In one example, RPC interfaces are not defined in the IDL files, but in the source codes. In this situation, the IDL files can be manually accessed and assembled into configure files.

The RPC interface parser 108 lists all RPC interface declarations, and list each interface's input/output parameters and return values. Further the RPC interface parser 108 defines exceptions and regulations for calling a specified RPC interface, and provides the relationships for RPC interfaces. These functions can also be accomplished automatically using the RPC Interface Parser 108, or a combination of automatic and manually to generate an RPC interfaces list.

In operation, the system 100 shown in FIG. 2. is implemented with the RPC interface parser 108 as a standalone application. The RPC interface parser 108 accepts both file inputs and manual inputs to generate the list of RPC interfaces, and then export the RPC interfaces into intermediate configure files. The intermediate configure files can be manually edited to be suitable for other modules.

An embodiment of a sample IDL file is below:

```
[
uuid(623b0fa0-86be-11d1-b63c-006097b73e30),
version(1.0)
]
interface RpcServiceSample
{
typedef struct
        {
            unsigned char szServer [ 48 ];
            unsigned char szUser[ 48 ];
            unsigned char szPW[ 48 ];
        } REMOTEINFO_RPC;
error_status_t ASRPCLaunchSetup(
        [in] handle_t Binding,
        [in, string] char* pszServerName,
        [in, string] char* pszSetupTempPath,
        [in, string] char* pszSCmdLine;
        [in] REMOTEINFO_RPC IpRemoteInfo);
error_status_t ASRPCFindFirstHardDrive(
        [in] handle_t Binding,
        [in] unsigned int nSpaceRequired,
        [out] char* pchDrive);
}
```

In the sample IDL file above, there are two RPC interfaces defined. The RPC interface parser 108 can parse the IDL file into an intermediate XML formatted configure file. For example, the RPC interface parser 108 will generate an XML file for each interface. The sample IDL file above is an XML file generated by RPC Interface Parser. In the second interface in the IDL file, three parameters are accepted. The first is an input parameter which is type "handle_t", the second is an input parameter which in type "unsigned int", and the third is an output parameter which is type "char*".

Using the information from the IDL file, the attack data generator 116 can generate corresponding data to attack the interface. For example, for the first parameter which is "handle_t", the attack data generator 116 can generate integer values from "0x00000000L" to "0xFFFFFFFFL" for attacking. Similarly, for the second parameter which is "unsigned int", the attack data generator 116 can generate integer values from 0 to 4294967295 for attacking. The first parameter should be a valid handle on the RPC interface on the server side, however, for example, if the RPC interface on the server side doesn't validate the input parameters and attempts to operate the invalid handle value, the possible results occur: the operations on the invalid handle fails; the RPC service accesses other unauthorized handle is unexpected; unexpected result returned to RPC client side; or RPC service crashes since it accesses an invalid handle.

Referring to FIG. 2, based upon the RPC interface parser 108, the attack data generator 116 will generate the necessary data used to attack the specified interface. In one embodiment of the invention, the attack data generator 116 is an independent module which can be used in other applications, for instance as a shared resource. In order to attack one RPC interface, thousands of different data files may be used by the attack data generator 116. The attack data generator 116, accepts a given buffer which related to a data structure, and accepts the data structure description. Additionally, the attack data generator 116 also accepts the data structure exceptions and regulations. Using the sample IDL file above, the IDL file input parameters are used by the attack data generator 116 to fill the buffer of the server side RPC interface with randomized data.

A kernel of the attack data generator 116 is a randomized data generator 118. The randomized data generator 118, can generate fully randomized data with high performance according to requirements. For example, a sample random integer creator is as below:

```
unsigned random( )
{
return (seed = (seed * 10807L) & 0x7fffffffL);
}
```

For example, a series of random date generators to meet a specified target, such as:

```
short          randomShort(void);
/* Generates a short integer value from (-32768) to 32767*/
Ushort         randomUShort(voie);
/* Generates an unsigned short integer value from 0 to 65535 */
int            randomInt(void);
/* Generates an integer value from (-2147483648) to 2147483647 */
uint           randomUInt(void);
/* Generates an unsigned integer value from 0 to 4294967295 */
long           randomLong(void);
/* generates a long integer value from -9223372036854775808 to 9223372036854775807 */
ulong          randomULong(void);
/* Generates an unsigned long integer value from 0 to 18446744073709551615 */
char           randomChar(void);
/* Generates a single character, include letters, digits, and others */
char*          randomStr(char* inBuf, size_t len);
/* String is make up of characters, so it is based upon randomChar(void) */
enum randomEnum(enum   enumSet);
/* Enumeration is a set of integers, so this is based up randomInteger(void) */
```

The recorder 120 records the steps and data of an attack on an RPC interface. Using the recorded information, the attack process can be reproduced. Similar to the attack data generator 116, the recorder 120 is another independent module which can be used by other application, and thus dependencies to other modules are avoided. The recorder 120 provides the following two functionalities: recording the steps and data used in an attack process; and replaying the attack process by recorded steps and data.

Figure 4:
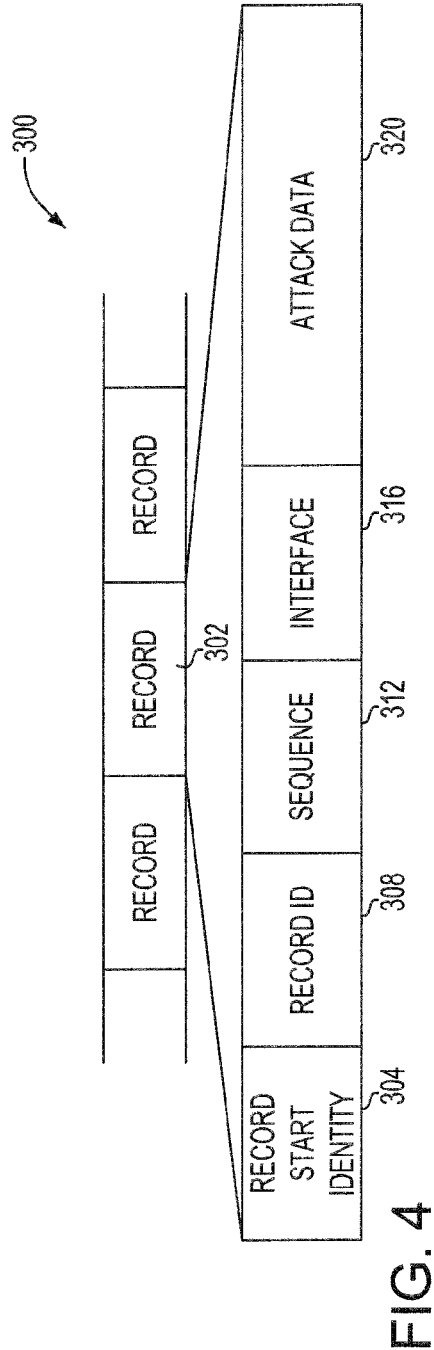
FIG. 4 is a block diagram of a file record.

Referring to FIG. 4, the recorder 120 records the steps and data of the attack into log files 300 having a format which includes a plurality of segments having fixed values. A record start identity segment 304 indicates the start of a record of a certain step and its data, for example, a 16 byte Universally Unique Identifier (UUID). Each RPC interface has a unique ID which can be used in a record ID segment 308 and recorded using the recorder 120. A sequence segment 312 contains a serial number of a current record 302. An interface segment 316 saves an RPC interface declaration which segment begins with length data. An attack data segment 320 contains the attacking data of the current attack step, and the segment begins with length data.

The verifier 132 is used to reproduce the detected vulnerability, and verify the fixes or modification to remedy the vulnerability. The remedy may include, for example, source code changes and additions. The verifier 132 accepts the record ID as input, and then communicates with the recorder 120 to retrieve attack steps and data from log files, and then rerun the attack steps to attempt to reproduce the previous defect or error. Thereby, the remedy is verified if the vulnerability is not present in the rerun of the attack steps. The verifier 132 can automatically run the attack process repeatedly for a defined number of retry or rerun time. For example, the verifier 132 can be configured to perform the rerun a thousand times before concluding that a defect is remedied.

Figure 5:
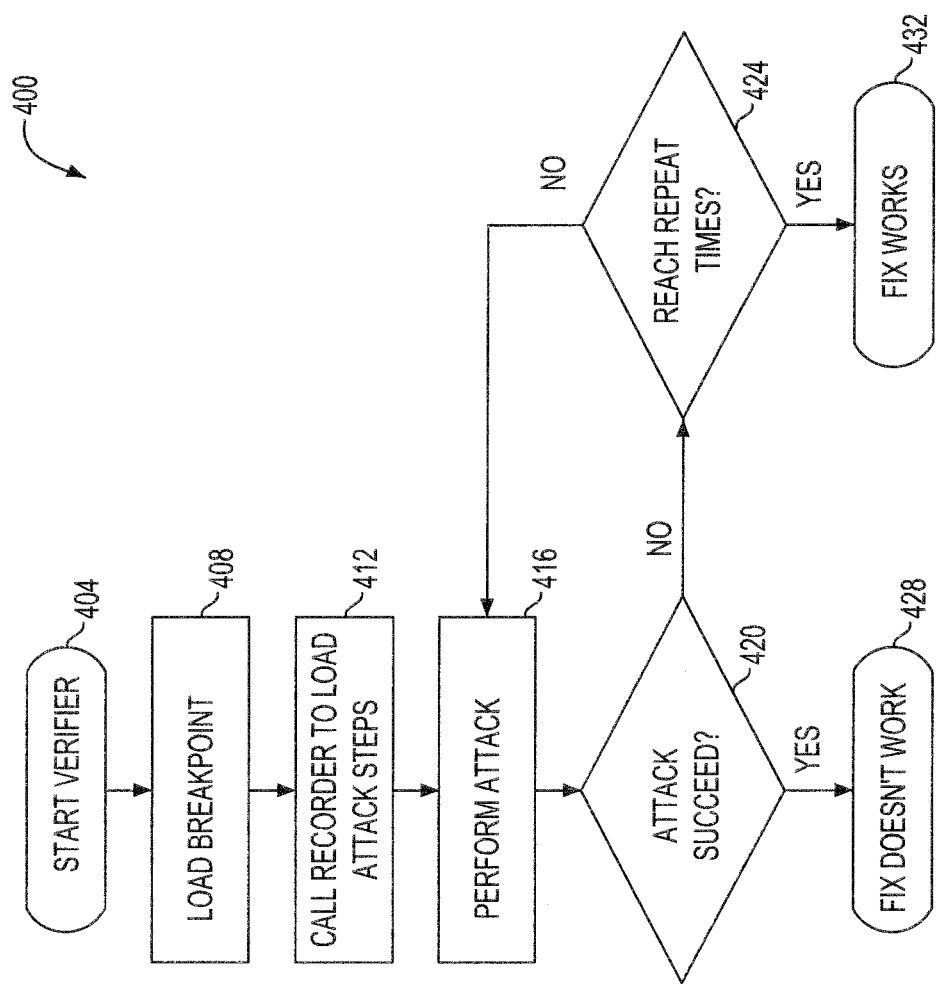
FIG. 5 is a flow chart of a verification procedure according to an embodiment of the invention.

Referring to FIG. 5, a flow chart 400 recites the steps of the verifier 132 in an embodiment of the present invention. The verifier is started in step 404. A load breakpoint is defined in step 408 including an amount of time an attack will be rerun to verify a remedy. The verifier communicates with the recorder 120 to load previously recorded attack steps in step 412. The verifier then initiates the attack using the attack data generator 116 in step 416. The verifier 132 determines if the attack has succeeded or failed in step 420. If the attack has detected a vulnerability, the method indicates that the fix or remedy has not succeeded in step 428. If the attack has not initiated any vulnerabilities and has not reached a preset number of iterations in step 424, the method returns to step 416 to continue the attack. Once the preset number of iterations is reached in step 424, and the attack has not detected any vulnerabilities, the fix or remedy is successful as show in step 432.

Thereby, the RPC interface parser 108 interprets IDL files and converts them into XML files. The fuzzer 112 reads the XML file and extracts a full list of defined RPC interfaces. The fuzzer 112 runs into a loop to attack each interface one by one. The fuzzer invokes the attack data generator 116 to attack each interface with various randomized data. The recorder 120 records the attack progress, interface, attacking data and steps into a data file. The service status detective 128 detects the RPC service 140 status, and restarts it if necessary. The verifier 132 reads the data file generated by the recorder 120 to replay the attack progress to check whether the vulnerability has been fixed. A user regards only the fix process once a problem is found by the tool 100. During the fix process, the user can invoke the verifier 132, at will, to verify the fix. For example, the most common vulnerabilities during software development, which can be attacked by this tool, are: integer overflow; buffer overflow; and invalid handle.

One advantage of the tool of the present invention includes testing an RPC software product to reveal vulnerabilities for RPC services before the software product is sold or delivered, thus improving quality control of the software product. Additionally, the tool of the present invention automates and streamlines the process for testing RPC service interfaces. Further, the tool of the present invention can be used for any manufacturers RPC services.

One advantage of the tool of the present invention is that it is compatible with all RPC based applications, including MSRPC Microsoft® Remote Procedure Call and ONCRPC Open Network Computing Remote Procedure Call. Another advantage of the tool 100 is that using an IDL file, it can attack all defined RPC interfaces using few system resources and thus does not over load a computer system. Further, the tool 100 only loads RPC services that are attacked without loading non attacked service of the RPC program. Additionally, the tool 100 can attack the same RPC service with multiple attackers thereby being more efficient that sequential singular attacks. The method using the tool of the present invention is provided automatically and thereby does not require frequent manual intervention.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for testing a computer program using a computer system comprising computer readable medium having a program recorded thereon and being executable by a processing unit, comprising:
   identifying at least one program file in a specified program;
   defining at least one program interface in the program file of the specified program;
   specifying an attacking procedure of the specified program;
   attacking, using the attacking procedure, the interface in the program file, the attacking procedure performed using an attack data generator module generating randomized data based on the interface;
   defining vulnerabilities in the specified program;
   determining that the defined vulnerabilities are present in the specified program using the attacking procedure;
   recording the attacking procedure; and
   replaying the attacking procedure to verify that the determined vulnerabilities have been remedied.

2. The method of claim 1, further comprising:
   remedying the vulnerabilities in the specified program; and
   verifying the remedies by replaying the attacking procedure of the interface and determining vulnerabilities.

3. The method of claim 1, wherein the specified program comprises a plurality of program interfaces.

4. The method of claim 1, further comprising, restarting the specified program when the specified program ceases to operate.

5. The method of claim 1, wherein the step of defining at least one program interface uses an interface parser module.

6. The method of claim 1, wherein the specified program is an RPC program having RPC interfaces and an IDL file as the program file.

7. The method of claim 6, further comprising:
   converting the IDL file into an XML file.

8. The method of claim 7, wherein a fuzzer module reads the XML file and identifies the RPC interfaces.

9. The method of claim 8, the step of attacking the interface further comprises the attack data generator module communicating with the fuzzer.

10. The method of claim 9, further comprising:
    restarting the RPC program when the RPC program ceases operation using a service status detective module.

11. The method of claim 10, further comprising:
    remedying the vulnerabilities in the specified program.

12. A computer program product for testing a computer program using a plurality of computer systems communicating using a network, the computer program product comprising:
    a tangible computer readable storage medium having computer readable program code embodied in the medium, the computer readable program code comprising:
    computer readable program code configured to identify at least one program file in a specified program;
    computer readable program code configured to define at least one program interface in the program file of the specified program;

computer readable program code configured to specify an attacking procedure of the specified program;

computer readable program code configured to attack, using the attacking procedure, the interface in the program file, the attacking procedure performed using an attack data generator module generating randomized data based on the interface;

computer readable program code configured to define vulnerabilities in the specified program;

computer readable program code configured to determine that the defined vulnerabilities are present in the specified program using the attacking procedure;

computer readable program code configured to record the attacking procedure; and computer readable program code configured to replay the attacking procedure to verify that the determined vulnerabilities have been remedied.

13. The computer program product of claim 12, further comprising computer readable program code configured to restart the specified program when the specified program ceases to operate.

14. The computer program product of claim 12, wherein the specified program is an RPC program having RPC interfaces and an IDL file as the program file.

15. A system for testing a computer program, comprising:

a computer system including a processing unit, wherein the processing unit comprises an interface parser module that defines at least one program interface in a program file of a specified program;

a fuzzer module that reads the program file and identifies the program interfaces;

an attack data generator module that attacks the program interfaces by generating and attacking with randomized data based on the interface and communicates with the fuzzer, the fuzzer determines vulnerabilities in the specified program; and a recorder module that records the attacking procedure; and a verifier module that verifies remedies of vulnerabilities by replaying the attacking procedure of the program interface using the attacking procedure recorded by the recorder module.

16. The system of claim 15, further comprising:

a service status detective module that restarts the specified program when the specified program ceases to operate.

\* \* \* \* \*